UNITED STATES PATENT OFFICE.

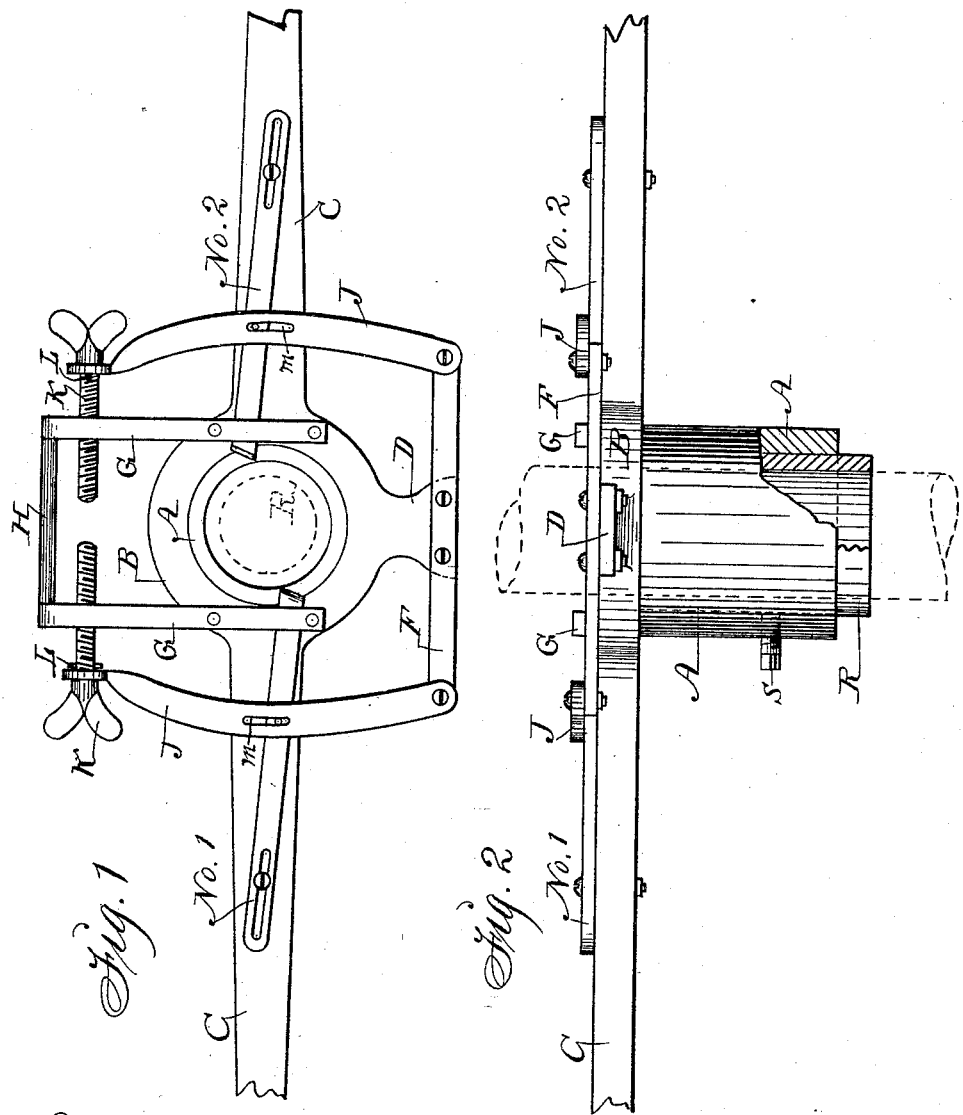

JOHN HAMMERAND, OF PORTSMOUTH, IOWA.

PIPE-CUTTER.

SPECIFICATION forming part of Letters Patent No. 415,714, dated November 26, 1889.

Application filed June 14, 1889. Serial No. 314,239. (No model.)

*To all whom it may concern:*

Be it known that I, JOHN HAMMERAND, a citizen of the United States of America, residing at Portsmouth, in the county of Shelby and State of Iowa, have invented a new and useful Pipe-Cutter, of which the following is a specification.

My object is to facilitate the labor of cutting a tube by hand-power; and my invention consists of a portable tool adapted to be placed on pipes of different sizes, and constructed as hereinafter set forth and claimed.

Figure 1 of the drawings is a top view, and Fig. 2 a side view, of the machine, from which the ends of the handles and parts of the tubes are broken away.

A is an open-ended tube formed on or fixed to a circular frame B, to extend downward at right angles from the frame.

C are integral handles extending horizontally and in the same plane from the center of the circular frame and tube.

D is an integral projection that extends at right angles to the handles to support a cross-bar F, fixed on the top.

G are straight bars fixed in parallel position across the top of the frame and connected at their outer ends by an end bar H.

J are levers of the second order pivoted to the ends of the cross-bar F. They have eyes at their free ends, through which thumb-screws K are passed, and secured by means of pins L, so they can be rotated in screw-threaded bearings formed in the fixed bars G.

1 and 2 are cutters that have slots in their outer ends, through which screws are passed and fastened in the handles to allow longitudinal motion to the cutter and to guide their movements. Each cutter has a pin fixed thereto, to extend through a slot *m* in the lever J. The cutting-edge on the inner end of 1 is convex, and on 2 V-shaped in its cross-section.

R is a thimble detachably fastened in the open-ended tube by means of a set-screw S in such a manner that a pipe corresponding in diameter can be extended through the machine, as indicated by dotted lines in Fig. 2, and the tool then rotated on the pipe as required to operate the cutters to cut off the pipe at the point where the cutters are allowed to engage it. Thimbles that differ in the diameter of their bores, but are uniform in circumference with the interior of the tube A, can be thus interchangeably connected with the machine to adapt it to be operated on pipes of different sizes.

To cut off the end of a pipe, fasten it in a vise, or by any other suitable means, and then slip the open-ended tube and tool over the pipe and press the cutting ends of the cutters against the outside of the pipe by operating the right and left screws with the fingers. Each revolution of a screw will draw the lever with which it is connected toward the center of the tool, and in so doing will advance the cutter connected with the lever as required to make it penetrate the outside of the pipe, so that when the tool is rotated around the pipe, by means of the handles seized in the operator's hands, an annular groove will be cut in the outside surface of the pipe, and by repeatedly advancing or feeding the cutters inward the groove will be deepened at each revolution of the machine until the pipe is severed at the point where the cutters are applied.

I claim as my invention—

A pipe-cutter consisting of an open-ended tube, a circular frame having handles projecting in opposite directions from the outer edge, bars fixed in parallel position across the top of the frame and provided with screw-threaded perforations, a cross-bar fixed to the frame and levers pivoted to the ends of the bar, thumb-screws extended through eyes in the ends of the levers and also through the screw-threaded perforations of the fixed parallel bars, and cutters having slots through which screws are extended into the handles, and pins fixed to the cutters to project through slots in the levers, arranged and combined to operate in the manner set forth.

JOHN HAMMERAND.

Witnesses:
C. F. DOHRMANN,
H. HELLWIG.